(12) United States Patent
Kumar et al.

(10) Patent No.: US 11,760,320 B2
(45) Date of Patent: Sep. 19, 2023

(54) BRAKE CONTROL SYSTEM

(71) Applicant: Transportation IP Holdings, LLC, Norwalk, CT (US)

(72) Inventors: Ajith Kuttannair Kumar, Erie, PA (US); Brian Meyer, Erie, PA (US); Chris Wiesner, Erie, PA (US); Matthew Paul Ensley, Springfield, MO (US); Patricia Sue Lacy, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 901 days.

(21) Appl. No.: 16/779,012

(22) Filed: Jan. 31, 2020

(65) Prior Publication Data

US 2021/0237696 A1 Aug. 5, 2021

(51) Int. Cl.
| | |
|---|---|
| *B60T 7/12* | (2006.01) |
| *B60T 7/16* | (2006.01) |
| *B61H 13/00* | (2006.01) |
| *B60T 17/22* | (2006.01) |

(52) U.S. Cl.
CPC .............. *B60T 7/16* (2013.01); *B60T 7/126* (2013.01); *B60T 17/228* (2013.01); *B61H 13/00* (2013.01); *B60T 2250/00* (2013.01)

(58) Field of Classification Search
CPC ... B60T 7/126; B60T 7/16; B60T 7/18; B60T 17/22; B60T 17/228; B60T 2250/00; B61H 13/00
See application file for complete search history.

(56) References Cited

U.S. PATENT DOCUMENTS

| | | | |
|---|---|---|---|
| 8,155,810 B2 | 4/2012 | Miyauchi | |
| 8,311,689 B2* | 11/2012 | Plawecki | B60T 7/126 701/2 |
| 8,838,302 B2* | 9/2014 | Kumar | B61L 3/006 701/19 |

(Continued)

FOREIGN PATENT DOCUMENTS

| | | |
|---|---|---|
| JP | 3259670 B2 | 2/2002 |
| JP | 3371728 B2 | 1/2003 |

(Continued)

OTHER PUBLICATIONS

First Examination Report dated May 26, 2022 for corresponding Indian Patent Application No. 20201405590 (5 pages).

(Continued)

*Primary Examiner* — Thomas W Irvin
(74) *Attorney, Agent, or Firm* — The Small Patent Law Group LLC; Christopher R. Carroll (57) ABSTRACT

A brake control system includes an interface controller configured to communicate with different control paths of sources for control of a brake system of a vehicle system. Each of the control paths is configured to communicate a control signal from a different source of the sources to control operation of the brake system. The interface controller is configured to arbitrate between the control signals concurrently received from the different sources via the control paths to dictate which of the different sources controls operation of the brake system at different times and prevent control by other sources of the different sources from concurrently controlling the operation of the brake system.

21 Claims, 3 Drawing Sheets

(56) References Cited

U.S. PATENT DOCUMENTS

| | | | |
|---|---|---|---|
| 9,045,123 B1 | 6/2015 | Cooper et al. | |
| 9,235,991 B2 * | 1/2016 | Cooper | B61L 27/16 |
| 9,493,143 B2 * | 11/2016 | Cooper | B60T 17/228 |
| 9,845,091 B2 * | 12/2017 | Greene | B60W 10/06 |
| 10,060,427 B2 * | 8/2018 | Siuchta | F04B 35/002 |
| 11,290,980 B2 * | 3/2022 | Nabetani | H04W 64/006 |
| 2006/0076826 A1 | 4/2006 | Kane | |
| 2007/0142984 A1 * | 6/2007 | Plawecki | B60T 7/126 701/2 |
| 2013/0325258 A1 * | 12/2013 | Cooper | B60T 17/228 701/70 |
| 2014/0136025 A1 * | 5/2014 | Cooper | B61L 3/006 701/2 |
| 2014/0188375 A1 * | 7/2014 | Kumar | B60L 15/2045 701/117 |
| 2014/0277883 A1 * | 9/2014 | Pulliam | B60L 1/003 701/22 |
| 2014/0365096 A1 | 12/2014 | Cooper et al. | |
| 2014/0369853 A1 * | 12/2014 | Siuchta | B60T 17/02 417/213 |
| 2017/0274918 A1 | 9/2017 | Reynolds et al. | |
| 2017/0320487 A1 * | 11/2017 | Greene | B60W 30/18172 |
| 2018/0170413 A1 | 6/2018 | Wright et al. | |
| 2019/0281578 A1 * | 9/2019 | Nabetani | H04B 7/022 |
| 2020/0156604 A1 | 5/2020 | Liu et al. | |
| 2020/0406873 A1 * | 12/2020 | Sunahara | B60W 10/18 |
| 2021/0188224 A1 * | 6/2021 | Barr | B61H 13/00 |
| 2022/0044584 A1 * | 2/2022 | Jovenall | B60T 7/18 |
| 2022/0340119 A1 * | 10/2022 | Karunaratne | G07C 5/0808 |

FOREIGN PATENT DOCUMENTS

| | | |
|---|---|---|
| WO | 2009127597 A1 | 10/2009 |
| WO | 2019095699 A1 | 5/2019 |

OTHER PUBLICATIONS

Examination Report No. 1 dated Dec. 7, 2021 for corresponding Australian Patent Application No. 2020294237 (8 pages).

Office Action dated Feb. 14, 2023 for corresponding Canadian Patent Application No. 3,103,902 (3 pages).

* cited by examiner

BRAKE CONTROL SYSTEM

BACKGROUND

Technical Field

The subject matter described herein relates to systems and methods that control brake systems of vehicles.

Discussion of Art

Vehicle control systems grow increasingly complex over time. In addition to manual control, some vehicles have automatic or semi-automatic control systems that can fully or partially control movement, braking, etc., of the vehicles without operator intervention (or with some operator intervention). Additionally, some vehicles are equipped with safety systems that operate in certain situations to take over or automate certain actions to ensure the safe operation of the vehicles or safety of personnel, other vehicles, and equipment.

One example of vehicles having complex control systems are rail vehicles. For example, heavy freight vehicle systems (e.g., trains) may have multiple propulsion-generating vehicles (e.g., locomotives) distributed at various positions along the vehicle system so as to control the forces, improve handling, and/or reduce fuel consumption. These vehicles can produce motoring or propulsion power at various levels to control the speed of the vehicle system. Similarly, dynamic brakes in the vehicles can be used to slow the vehicle system. Automatic brakes (e.g., consist brakes) using an air brake system on the vehicles can be used to slow the vehicle system.

There may be different types of brake systems. For example, there may be two different types of airbrake systems in use, such as freight air brakes and electronically controlled pneumatic (ECP) air brakes. In the former, control and actuation of the brake system are controlled using airbrake pressure in the brake system (e.g., in conduits, cylinders, reservoirs, etc., of the brake system). In the ECP system, control of the brake system is communicated using electrical signals and actuation of the brake system is controlled using airbrake pressure. There can be limitations in applying some of these types of brake systems. For example, in airbrake systems, there can be temporal limitations in activating the brake system due to the time needed to pneumatically communicate signals and to recharge pressure in the brake system.

In addition to manual control of brake systems, other systems can control the brakes of a vehicle system. For example, a planning system can automatically control motoring power, dynamic brake power, and distributed power of the vehicle system. The air brake controls, however, may remain under manual control. While the planning system can control or dictate control of the vehicle system in ways that reduce fuel consumption, emission generation, etc., the inability of such a planning system to also control some brake systems of a vehicle system limits performance of the planning system. Other systems may be similarly limited in control of some brake systems.

Additionally, as more control systems onboard a vehicle have access to or control over the same or different brake systems, the risk of inconsistent or incompatible control of the brake system(s) by different control systems increases.

BRIEF DESCRIPTION

In one embodiment, a brake control system includes an interface controller configured to communicate with different control paths of sources for control of a brake system of a vehicle system. Each of the control paths is configured to communicate a control signal from a different source of the sources to control operation of the brake system. The interface controller is configured to arbitrate between the control signals concurrently received from the different sources via the control paths to dictate which of the different sources controls operation of the brake system at different times and prevent control by other sources of the different sources from concurrently controlling the operation of the brake system.

In one embodiment, a method includes concurrently receiving control signals from different sources for control of operation of a brake system onboard a vehicle system, arbitrating between or among the control signals to determine which of the different sources controls operation of the brake system at different times, and preventing control of the brake system by other sources of the different sources from concurrently controlling the operation of the brake system.

In one embodiment, a brake control system includes an interface controller configured to concurrently receive brake control signals from different sources for concurrent control of an airbrake system of a vehicle system. The interface controller is configured to select one of the brake control signals. The interface controller is configured to communicate the brake control signal that is selected to the airbrake system for controlling operation of the airbrake system.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the inventive subject matter described herein relate to brake control systems and methods that arbitrate between different inputs to control the same or multiple brake systems of a single or multi-vehicle system. With respect to rail vehicles, the systems and methods can determine which of automatic brakes (or train brakes, where all brakes are applied), car brakes (where the brakes of one or more individual cars are applied), consist brakes (where the brakes of the cars and locomotives within a consist are applied), independent brakes (where the brakes of locomotives are applied), parking brakes (e.g., hand brakes), automatic brakes with bail off (apply the automatic brakes of the cars but not the locomotives). As one example, a trip management system may determine operational settings for controlling a vehicle system during a trip (e.g., to reduce fuel consumption, emission generation, or the like). The control systems and methods can allow for this trip management system (and one or more other inputs, such as manual input) to control a brake system of the vehicle system, such as an airbrake system. This can improve the fuel efficiency, travel time, handling of the vehicle system, or another variable. The fuel efficiency and/or handling (e.g., forces imparted on the vehicle system) can be improved by allowing the trip management system to control the brake system to allow for stiffening individual vehicle to vehicle movement or slow/stop movement (for a slow order, for speed limits, to the end of the trip, to stop for a signal or the like, or to prevent high forces between vehicles on challenging terrain), instead of having an operator manually control the vehicle system to the slow or stop.

The control systems and methods can arbitrate between concurrently received control inputs to control the same brake system. For example, the control systems and methods can apply one or more rules, criteria, or the like, to determine which input of several inputs received at the same time or within a same time period (e.g., the time since the prior input, the inputs received within a designated time period such as three seconds, or the like) controls a brake system and/or which of several different brake systems are to be applied or engaged. For example, the systems and methods can determine which input is used to control brakes and whether to apply automatic brakes, automatic brakes with bail off, hand brakes, or the like, based on the selected input. The control systems and methods can switch or revert back to manual control at any time due to dynamic nature of the route and the conditions encountered on the route. For example, control of a brake system may switch between or among automatic systems and manual control while the vehicle system is in motion and/or while also controlling motoring, dynamic braking, distributed power, consist control, automatic brake, independent brake operations, etc. These control systems and methods can operate with many existing vehicles (e.g., as a retrofit addition to the existing vehicle), and to be able to switch between automatic and manual control at any time during operation of the vehicle system.

In one embodiment, the control system establishes or maintains multiple parallel command structure paths to the same brake system, such as an airbrake system, with the ability to limit or not limit any one of the command structure paths. Each of the control structure paths can be a communication pathway and/or control signal received from a different source of controlling the brake system. The control system and method can arbitrate between the command structure paths in various ways to determine which of the sources can control a brake system. As some examples, the control system and method can allow the source instructing the larger (or largest) braking effort for that type of braking control to control that particular brake system, the source that provides the command input before one or more (or all) other concurrently supplied command inputs, the source instructing the smaller (or smallest) braking effort to be applied to control the brake system, the source providing the command input that will cause one or more vehicle handling parameters to remain within one or more preselected ranges of values, or the like. Optionally, the control system and method can determine the state or position of a switch (e.g., a selector switch) that is electronically and/or manually actuated to determine which of the sources can control a brake system.

The control system can be implemented in hardware circuitry. For example, the control system can include and/or be connected with one or more processors (e.g., integrated circuits, field programmable gate arrays, microprocessors, etc.), other hardware (that does not include processors), firmware, and/or hardware or the like. These components can arbitrate or be used to arbitrate which source controls a brake system. Optionally, the components can arbitrate or be used to arbitrate which component of a brake system (or which brake system) is used to slow or stop movement. For example, the control system can receive an input directing a brake application and determine whether to use automatic brakes, independent brakes, and/or hand brakes to implement the requested brake application.

Communication between one or more of the sources and the control system (e.g., an interface described herein) and/or between the control system and the one or more brake systems can deteriorate or be interrupted. For example, damage, interference, or the like, to communication paths, hardware, software, etc., may interfere with or prevent the communication of signals between a source and the control system and/or between the control system and a brake system. Responsive to a communication deterioration (up to and including communication loss), the control system can implement one or more responsive actions. These responsive actions can include a default to a designated brake application (e.g., a penalty brake application that fully applies one of the brake systems to stop movement of the vehicle system). Another action can include returning or remaining to manual control of one or more (or all) of the brake systems. A responsive action can include generating advisory or warning signals, such as generating audible sounds, activating lights, or the like. Another responsive action can include automatically applying a predefined amount of braking effort. For example, a default, predetermined reduction in air pressure in an airbrake system may automatically be implemented. Another responsive action can include defaulting to control of a brake system by or based on signals received from an off-board system. For example, the control system can automatically control the brake system based on signals received from a protection system, such as a positive train control system.

With respect to a hand brake or parking brake, the control system can direct the operator to move the hand brake to engage the brake system, and/or can automatically control the brake system to automatically engage the hand brake. The control system may direct the operator to release or automatically release the hand brake once the control system determines that the vehicle is to begin movement after being stopped. This can allow for an equivalent parking brake to be used that is not dependent on air pressure. For example, the control system may determine that the hand brake(s) are to be engaged to prevent movement of the vehicle system instead of using air brakes, even if there is an input directing the air brakes to be applied. The control system can determine that, because the vehicle system is stationary, the input directing the air brakes to be engaged should be ignored or changed to an input directing the hand brake(s) to be applied.

As another example, the control system can select which input is used to control brakes during movement of the vehicle system to slow the movement of the vehicle system. The control system may receive a first input directing the independent brakes to be applied (e.g., the brakes of only the locomotives) and may concurrently receive a second input directing the automatic brakes with bail off to be applied (e.g., the brakes of the cars and not the locomotives to be applied). The control system can determine that, because the vehicle system is moving, the second input directing the automatic brakes with bail off should be selected for application.

The control system can maintain or otherwise repeatedly communicate with the brake systems and/or sources of commands for the brake systems. For example, the control system can communicate feedback signals to the sources to notify the sources which sources commanded brake engagement and what action was taken based on the commanded engagements received from those sources. This can permit the sources to monitor how the brake systems are being controlled when multiple sources are attempting to concurrently control the brake systems.

The control system can be incorporated into a variety of vehicle systems, such as existing freight trains with various combinations of cars, consists, locomotives, locomotive positions, or the like. While the description herein refers to rail vehicles, not all embodiments are limited to rail vehicles. The vehicles and vehicle systems described herein may refer to automobiles, buses, trucks, mining vehicles, aircraft (manned or unmanned), marine vessels, agricultural vehicles, or the like, that use systems to slow or stop movement of the vehicles. A vehicle system can include a single vehicle or multiple vehicles. Multi-vehicle systems can include two or more vehicles that are mechanically coupled with each other to travel together as a vehicle system. Other multi-vehicle systems can include two or more vehicles that logically, but not mechanically, coupled with each other. These vehicles can communicate with each other to coordinate their movements with each other to travel together along routes (e.g., as a convoy). The arbitrations described herein can be used to prepare brake usage for long downhill runs, steep downhill runs (e.g., to condition the brakes in cold weather), to apply air brakes in cars while some locomotives may be in motoring for train handling (for coupler force limiting, for in-train force reduction, for rail force control, etc.).

Figure 1:
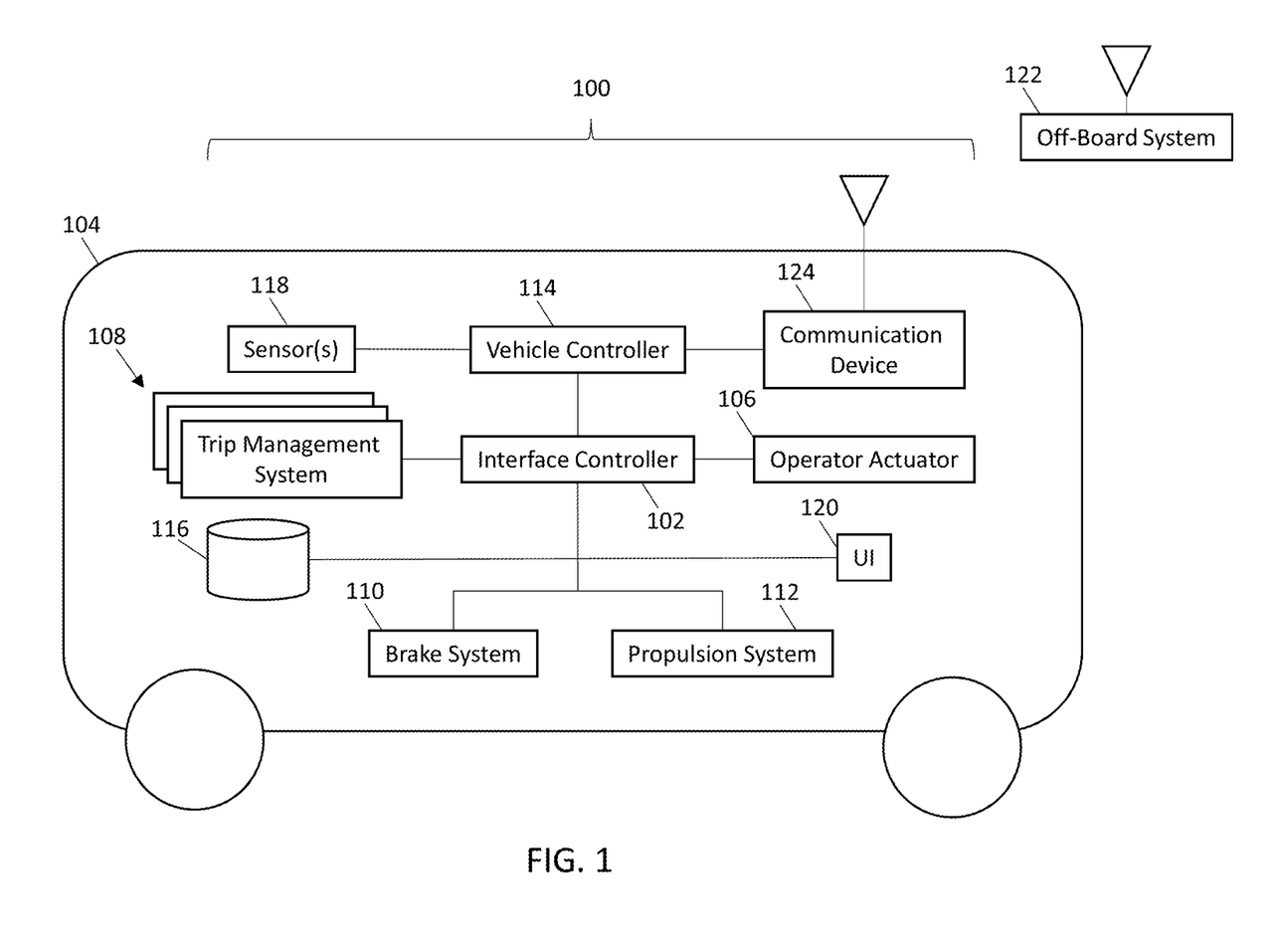
FIG. 1 illustrates one example of a brake control system.

FIG. 1 illustrates one example of a brake control system 100. The control system includes an interface controller 102 that determines which of several sources can control one or more brake systems of a vehicle system 104. The sources can include an operator actuator device 106 (e.g., "Operator Actuator" in FIG. 1) and one or more source systems or devices 108. The actuator device can be a handle, lever, button, pedal, switch, or the like, that can be manually moved by an operator to control or attempt to control a brake system. The source systems or devices can include computer systems that output control signals to control brake systems.

As one example, a source system can include a trip management system that represents hardware circuitry having or connected with one or more processors. This trip management system can determine operational settings of the vehicle system at different locations, times, distances, etc., along routes or paths of a trip to drive the vehicle system to achieve one or more objectives on the trip. These operational settings can be used to control (e.g., dictate) movement of the vehicle system, such as by automatically implementing the operational settings (e.g., using a vehicle controller 114, described below), by directing an operator to manually control the vehicle system according to the operational settings, etc. The objective(s) of the operational settings can include reducing fuel consumption, reducing emissions generated, reducing sounds generated, reducing wear and tear on the vehicle system and/or routes, achieving desirable travel time, or the like, relative to the vehicle system traveling according to other settings (while arriving at a destination at the same time). The operational settings can include brake settings (e.g., representative or associated with an amount of braking effort to apply), throttle settings, speeds, or the like. The set of operational settings for an entire trip or a segment of the trip can be referred to as a trip plan.

The vehicle system includes at least one brake system 110. This brake system can be an airbrake system having conduits, reservoirs, air cylinders, or the like, that control pressure in the airbrake system to engage or release friction brakes to slow or stop movement of the vehicle system. Optionally, the brake system may use another type of brake, such as a friction brake that does not operate pneumatically (for example, disc brakes, hand brakes, etc.). The vehicle system can include a propulsion system 112 that can generate thrust or propulsion to move the vehicle system along routes. The propulsion system can include engines, batteries, motors, or the like. In one embodiment, the propulsion system can operate (at least temporarily) as a brake system. For example, the propulsion system can include motors that can provide regenerative braking effort to slow or stop movement of the vehicle system. As another example, the propulsion system can include a propeller that can operate in reverse to slow or stop movement of the vehicle system. The vehicle system may include one or more additional or different brake systems than those shown in FIG. 1.

Another source can be a vehicle controller 114. The vehicle controller can represent hardware circuitry that includes and/or is connected with one or more processors that control operation of the vehicle system. The vehicle controller can receive control inputs from onboard and/or off-board sources to determine throttle settings, brake settings, or the like, to control movement of the vehicle system. As one example, the vehicle controller can represent an engine control unit, an electronic control unit, or the like.

The interface controller can be communicatively coupled with the sources and the brake system(s) via control paths. For example, conductive pathways (e.g., wires, buses, cables, or the like) and/or wireless pathways (e.g., wireless communications) and/or optical pathways (e.g., fiber optic cables) can be control paths used to communicate signals between the sources and the interface controller. The interface controller also can be communicatively coupled with the brake system(s) with control paths. A different control path may separately couple a source with the interface controller such that no two control paths couple the same source with the same interface controller. Alternatively, two or more control paths may be shared (e.g., used) by different sources. A different control path may separately couple the interface controller with the brake system such that no two control paths couple the same brake system with the same interface controller. Alternatively, two or more control paths may be shared (e.g., used) by different brake systems.

During movement of the vehicle system, different sources may concurrently provide control signals to control the same or different brake systems. For example, two or more different sources may output brake control signals at the same time or within a designated time period, such as one second, three seconds, five seconds, or the like. These control signals from different sources may be inconsistent with each other. For example, different sources may direct different amounts of braking effort to be supplied by the same brake system. As another example, different sources may direct the same brake system to operate in different ways. An air brake system may be concurrently directed by different sources to operate as independent brakes, automatic brakes, automatic brakes with bail off, and to apply a hand brake. As another example, different sources may direct different brake systems to be engaged.

The interface controller can receive these concurrent control signals and arbitrate between the control signals to dictate which of the different sources controls operation of the brake system and/or how the brake system is controlled. This arbitration also can prevent control of the brake system by other sources from concurrently controlling the operation of the brake system. For example, responsive to concurrently receiving control signals from the operator actuator and the trip management system, the interface controller can decide that the control signal received from the trip management system is used to control the brake system 110. The interface controller can send or allow the control signal from the trip management system to be communicated to the brake system 110 while the control signal from the operator actuator is prevented from being communicated to the brake system 110. For example, the interface controller can block communication of the control signal from the operator actuator to the brake system 110.

As another example, responsive to concurrently receiving control signals from the operator actuator and the trip management system, the interface controller can decide that the control signal received from the operator actuator is used to control the brake system 110. The interface controller can send or allow the control signal from the operator actuator to be communicated to the brake system 110 while the control signal from the trip management system is prevented from being communicated to the brake system 110. This allows for the interface controller to arbitrate between which of the sources controls the vehicle system during slowing or stopping (e.g., at the end of a trip, due to a movement authority, due to a slow order, due to a reduced speed limit, etc.).

As another example, the interface controller can determine how the brake system is to be controlled by arbitrating between different inputs from different sources. One source may direct an air brake system to apply automatic brakes, while another source may direct the same air brake system to apply automatic brakes with bail off. The interface controller can arbitrate between these inputs and select one of the inputs to control the air brake system (e.g., apply the brakes as automatic brakes with bail off and not just automatic brakes).

Optionally, several interface controllers may be provided. Each interface controller can be associated with a different brake system. The interface controller for each brake system can receive multiple inputs directing concurrent control of the same brake system. The interface controller for each brake system can then determine which of these inputs is used to control the brake system of that interface controller. The multiple interface controllers can communicate with each other to determine which brake system(s) are applied. For example, a first interface controller that controls or directs control of automatic brakes with bail off can communicate with a second interface controller that controls or directs control of independent brakes of the same vehicle system. The first and second interface controller can determine which of the automatic brakes with bail off or the independent brakes are to be used. This decision may be based on one or more of the rules or algorithms described herein.

Another example of a source that can control the brake system is a distributed power system. The distributed power system can be a group of vehicle controllers in a multi-vehicle system that control movements of the vehicles as a group. For example, one vehicle controller in the group can be the lead controller and one or more other vehicle controllers in the group can be trail or remote controllers. The lead controller can send control signals to the trail or remote controllers to control tractive efforts and/or braking efforts provided by the vehicles being controlled by the trail or remote controllers. The control signal sent from a lead vehicle to a remote vehicle to control a brake system of the remote vehicle can be one of the control signals arbitrated by the interface controller to determine which source can control the brake system.

The interface controller can use or apply different rules or criteria to determine which of the sources controls braking of the vehicle system. These rules or criteria can be arbitration rules stored in a tangible and non-transitory computer readable storage medium, or memory 116. The rules can have different priorities such that, if two or more rules could apply to arbitrate between control signals received from different sources, one of the rules (e.g., having a higher or the highest priority) can be selected and applied by the interface controller to determine which source controls the brake system. As another example, the interface controller can select a control signal from among several control signals received from different sources based on which control signal directs more braking effort to be generated by the brake system. If the operator inputs a command requesting less braking effort but an off-board source, the trip management system, or the like, requests more braking effort, then the source requesting more (or the most) braking effort may be selected to control operation of the brake system.

In an opposite example, the interface controller can select a control signal from among several control signals received from different sources based on which control signal directs less braking effort to be generated by the brake system. If the operator inputs a command requesting less braking effort but an off-board source, the trip management system, or the like, requests more braking effort, then the operator input command may be selected to control operation of the brake system. The interface controller may select the control signal from among several concurrently received signals from different sources based on which control signal is received first (or at least before one or more other control signals).

In another example, the interface controller can select a control signal from among several control signals received from different sources operating the same software application to determine which brake system to apply. For example, multiple different sets of processors may separately run the same software to operate as multiple, different trip management systems. These different trip management systems may direct different brake systems be used at the same time or location and/or that the same or different brake systems be applied in different ways at the same time or location. The interface controller can select from among the inputs provided by these different trip management systems to decide which of the inputs is selected to control braking of the vehicle system.

The interface controller can select which source controls the brake system based on location information. The interface controller can select the source that controls the brake system based on the location of the vehicle on which the interface controller is located. If the interface controller is onboard a remote or trailing vehicle in a distributed power system, the interface controller may select the control signal communicated from the vehicle controller onboard the lead vehicle in the distributed power system (and may not select the control signal from another source onboard the remote or trailing vehicle). As another example, an interface controller onboard a vehicle in one position in a multi-vehicle system may select a different source to control the brake system than an interface controller onboard another vehicle that is in another position in the same vehicle system.

The interface controller optionally can include or represent a switch. This switch can be a mechanical switch that includes a manually actuatable body (e.g., a lever, button, etc.) that is moved between at least two different positions. The different positions of the actuatable body can conductively couple different conductive pathways in the interface controller with the brake system(s). These pathways may be communicatively coupled (e.g., via conductive pathways and/or wireless pathways) with the different sources. Different positions of the actuatable body can couple different sources with the brake system(s). As a result, this mechanical switch can be manually maneuvered to change which source controls the brake system. Changing the position of the mechanical switch changes which source controls the brake system. Optionally, the switch may be an electronic switch, a software-implemented switch, or the like, that changes which source can control a brake system based on a state of the switch.

The interface controller can arbitrate between the control signals to dictate which of the different sources controls operation of the brake system based on expected changes in vehicle handling parameters of the vehicle system. The vehicle handling parameters can be measured or calculated forces, accelerations, or the like, of the vehicle system. For example, a vehicle handling parameter may be forces imparted on couplers between vehicles in a multi-vehicle system, forces imparted on wheels of the vehicle by the route, vibrations of the vehicle, or the like. The vehicle handling parameter can be measured or based on output from one or more sensors 118. These sensors can include accelerometers, force sensors, distance sensors (e.g., radar, lidar, etc.), location sensors (e.g., wireless triangulation devices, global positioning system receivers), or the like. The accelerometers can measure vibrations experienced by the vehicle system. The force sensors can measure tension and/or compression imparted on couplers and/or the vehicles. The distance sensors can measure distances between vehicles to calculate or estimate forces imparted on couplers, etc. Optionally, the forces imparted on wheels of the vehicle system can be determined by the interface controller or the vehicle controller based on a speed of the vehicle system, curvature of the route, and/or grade of the route. The curvature and/or grade of the route can be stored in the memory. The vehicle controller and/or interface controller can use the curvature and/or grade, and the vehicle speed, to determine forces imparted on the wheels of the vehicle system.

The interface controller or vehicle controller can examine output from the sensors to determine different impacts on the vehicle handling parameters from the different control signals that are concurrently received from different sources. For example, the interface controller or vehicle controller can determine that a first source requesting a faster change in braking effort than a second source will result in inter-vehicle forces increasing more rapidly. The interface controller or vehicle controller can determine that the control signal from the second source should be used to control the brake system. As a result, the vehicle controller can direct the interface controller (or the interface controller can determine) to use the control signal from the second source to control the brake system.

As another example, the operator of the vehicle system can select a source to control the brake system. For example, the interface controller can receive operator input that identifies a source to control the brake system. The interface controller can then select the control signal from the operator-selected source to control the brake system when control signals from two or more sources are concurrently received.

As described herein, the vehicle or vehicle system may include different types of brake systems (e.g., brake systems that operate differently to generate braking effort). The interface controller can select the control signal used to control a brake system based on a priority between the different types of brake systems. For example, concurrently received control signals may direct different brake systems to generate braking effort. The interface controller can select the control signal that directs a higher priority brake system to be used (with the other control signal(s) not being used) to brake the vehicle system.

Optionally, the interface controller can modify the control signals when the sources concurrently request braking from different brake systems. For example, a first source can direct the airbrake system to brake and a second source can concurrently direct the motors of the propulsion system to regeneratively brake. The interface controller can arbitrate between these control signals and select the control signal from the first source due to the airbrake system having a higher priority than the regenerative brake system (e.g., the propulsion system).

One or more of the control paths between a source and the interface controller may deteriorate. For example, interference, a communication loss, or the like, can impede or prevent communication between a source and the interface controller. The interface controller can automatically control the brake system responsive to such a communication deterioration occurring. The interface controller can direct the brake system to automatically implement a penalty application of the brake system, to automatically implement another application of the brake system (e.g., less than a penalty or full engagement of the brake system, etc.), or the like, responsive to a communication deterioration occurring. Optionally, the interface controller can direct the brake system to be controlled by a default or preselected source of the sources responsive to a communication deterioration occurring. For example, if communication between the trip management system and the interface controller is impeded or lost, the interface controller may allow the brake system to only be controlled by the operator actuator unless and/or until communication between the trip management system and the interface controller is restored.

The vehicle system can include a user interface 120 that can output advisory signals to an operator of the vehicle system. For example, the user interface can include or represent an electronic display, a speaker, light sources, or the like, that generates visual and/or audible advisory signals to notify the operator of various events. The interface controller can direct the user interface to generate an audible and/or a visual notification responsive to deterioration or loss of communication between a source and the interface controller. For example, the user interface can sound an alarm, display text notifying of the loss of communication, or the like.

One or more off-board systems 122 may communicate with the interface controller and/or the vehicle controller via a communication device 124 onboard the vehicle system. The communication device can represent transceiving circuitry, such as one or more antennas, modems, or the like. The off-board system(s) also may include transceiving circuitry for wireless communication with the vehicle system. The off-board system can communicate control signals (configuration information or arbitration rule changes etc.) to control (directly or indirectly) the brake system. The interface controller can receive these control signals as a control path for arbitrating which source (including the off-board system) controls the brake system.

For example, the off-board system can represent a remote control device that is off-board the vehicle system but that communicates control signals to control propulsion and/or braking of the vehicle system. As another example, the off-board system can represent a protection system that restricts movements of the vehicle system (and potentially other vehicle systems) to assist with safe travel of the vehicle systems. The protection system can monitor locations and movements of vehicle systems, locations of maintenance personnel on routes, and the like, to determine where and when vehicle systems are permitted to travel. The protection system can be a back officer server of a positive control system that sends signals to vehicle systems to indicate that the vehicle systems are permitted to enter into certain route segments. As another example, the protection system can be a system such as the Advanced Civil Speed Enforcement System. If a vehicle system does not receive a signal from the positive control system, then the vehicle controller does not allow the vehicle system to enter into the route segment associated with the signal. For example, the vehicle control can instruct the interface controller (e.g., as a source device) to apply the brake system to prevent entry of the vehicle system into the route segment. If the vehicle system does receive the signal from the positive control system, then the vehicle controller can enter into the route segment associated with the signal. The protection system can be a negative control system that sends signals to vehicle systems to indicate that the vehicle systems are not permitted to enter into certain route segments. If a vehicle system does receive a signal from the negative control system, then the vehicle controller does not allow the vehicle system to enter into the route segment associated with the signal. If the vehicle system does not receive the signal from the negative control system, then the vehicle controller can enter into the route segment associated with the signal.

The interface controller can continue to receive and arbitrate the control signals received from off-board sources to control the brake system. In one embodiment, responsive to deterioration or loss of communication with one or more onboard sources, the interface controller can continue receiving and using the control signals from the off-board systems to control the brake system. For example, even if communication between the trip management system (and other onboard sources) and the interface controller is interrupted, the interface controller can continue to receive and use the signals received from the off-board systems to control the brake system.

The interface controller can communicate feedback signals to the sources that sent the control signals. The feedback signals can indicate which of the sources controlled engagement of the brake system. For example, after arbitrating and determining that a first source controlled the brake system, the interface controller can send feedback signals to the first source and one or more other sources. These signals can notify the sources which source controlled the brake system, the amount or level of braking effort that was applied, and/or which sources did not control the brake system. Optionally, the interface controller can communicate the signal indicating which source controlled the brake system and/or the amount of braking to the memory for storage by an event recorder. For example, an identification of which source controlled the brake system and/or the braking effort directed by that source can be stored in a log in the memory.

Figure 2:
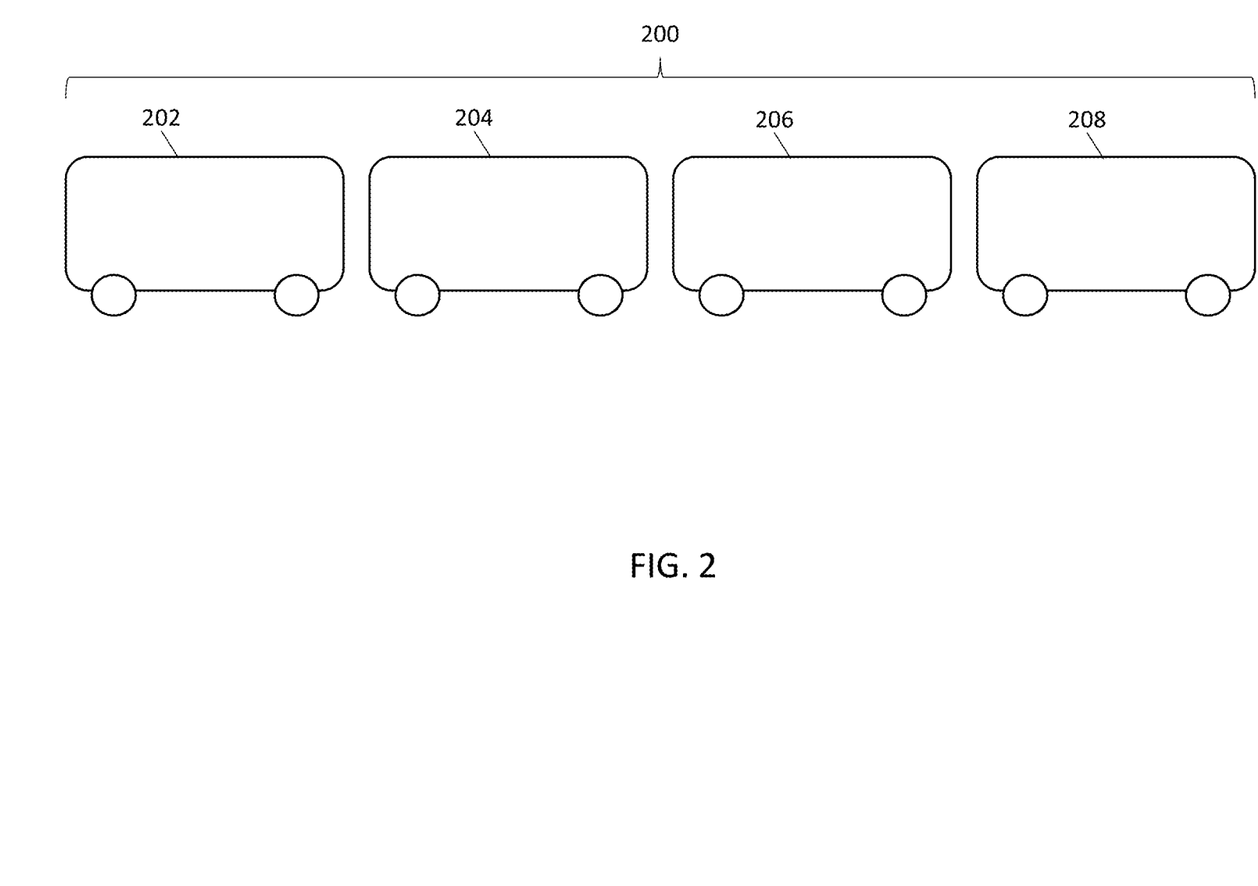
FIG. 2 illustrates one example of a multi-vehicle system.

FIG. 2 illustrates one example of a multi-vehicle system 200. The multi-vehicle system can include one or more of the vehicles 104 shown in FIG. 1. For example, the single vehicle system in FIG. 1 may be a single vehicle in the multi-vehicle system shown in FIG. 2. Alternatively, the brake control system 100 shown in FIG. 1 may be disposed onboard fewer than all of the vehicles of the multi-vehicle system. The vehicles of the multi-vehicle system are individually labeled as vehicles 202, 204, 206, 208. The multi-vehicle system may have as few as two, three, or more than four vehicles in the multi-vehicle system. Optionally, one or more of the vehicles in the multi-vehicle system may be a non-propulsion-generating vehicle, such as a rail car, trailer, or the like.

The interface controller can arbitrate between which control signal is used to control a brake system onboard a vehicle in the multi-vehicle system based on the location of the vehicle in the multi-vehicle system. For example, an interface controller onboard the vehicle 202 and an interface controller onboard the vehicle 206 may each concurrently receive control signals from different sources (to control a brake system on each vehicle 202, 206). The interface controllers may determine different control signals to control the brake systems based on the locations of the vehicles 202, 206. For example, the interface controller onboard the vehicle 202 can select a different source than the interface controller onboard the vehicle 206. As a result, different interface controllers can select different sources for controlling the brake systems independent of each other.

The interface controller can individually command the brakes to apply (or release) in each of one or more vehicles in the multi-vehicle system. For example, in contrast to directing all vehicles in the multi-vehicle system to apply ECP brakes onboard the vehicles at the same time, the interface controller may direct one vehicle to apply ECP brakes of that vehicle, another vehicle to not apply ECP brakes of that vehicle, another vehicle to concurrently apply ECP brakes of that vehicle to a different setting, and so on. Optionally, the interface controller can command the brakes to apply in two or more vehicles in a group or subset of the vehicles in a multi-vehicle system, where the group or subset does not include all vehicles in the multi-vehicle system. For example, in a vehicle system having thirty vehicles, the interface controller can direct the fifth through eighth vehicles in a first group to apply ECP brakes, the fifteenth through twentieth vehicles in a second group to apply ECP brakes (to the same or a different setting than the first group), and so on.

The brake control system can operate within vehicle systems that do not have interface controllers onboard all vehicles. For example, a vehicle may be manufactured to include an interface controller or may be retrofitted with the interface controller subsequent to manufacture and use of the vehicle. This vehicle may be included in a multi-vehicle system having one or more other vehicles that do not include the brake control system or interface controller. The interface controller onboard one vehicle can communicate commands to the brake systems of the other vehicles (that do not have an interface controller) to control these brake systems as described above. The brake systems of these other vehicles can be controlled by the interface controller without any change to the hardware and/or software of the other vehicles or the brake systems. For example, the interface controller can direct the brake systems of the other vehicles to engage or disengage as a function of time, a function of distance, based on arbitrated input signals, or the like.

Figure 3:
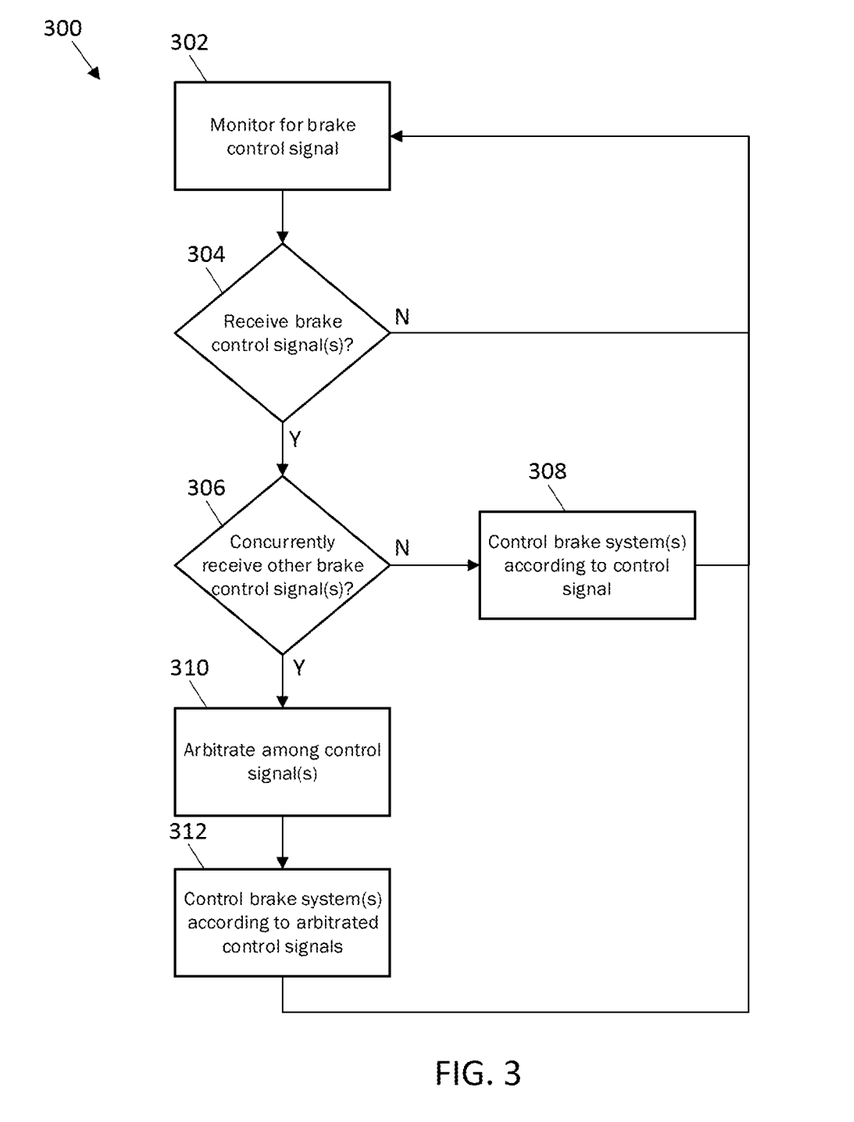
FIG. 3 illustrates a flowchart of one embodiment of a method for controlling brake systems of a vehicle or vehicle system.

FIG. 3 illustrates a flowchart of one embodiment of a method 300 for controlling brake systems of a vehicle or vehicle system. The method 300 can represent one embodiment of operations performed by the brake control systems described herein. At 302, operation of a vehicle system is monitored for issuance of one or more brake control signals. For example, the interface controller can monitor one or more conductive pathways and/or wireless pathways for communication of a control signal from one or more sources or source devices that seek to control operation of a brake system.

At 304, a determination is made as to whether one or more brake control signals has been received. If the interface controller determines that no brake control signal is received, then no change in operation of the brake system is requested. As a result, flow of the method 300 can return toward 302 so that the method 300 can continue monitoring for brake control signals. But, if at least one brake control signal is received, then flow of the method 300 can proceed toward 306.

At 306, a determination is made as to whether two or more control signals were concurrently received. For example, the interface controller can determine whether two or more different sources sent brake control signals within a designated time of each other (e.g., within one second, within three seconds, etc., of each other). If multiple brake control signals are concurrently received, then a decision as to which control signal to use to control the brake system may need to be made. As a result, flow of the method 300 can proceed toward 310.

At 308, the single brake control signal that is received (within the designated time period) is communicated to the brake system to control the brake system. For example, the brake system may be controlled to increase the amount of braking effort applied, to maintain the amount of braking effort applied, or to decrease the amount of braking effort applied (depending on the content of the brake control signal). Flow of the method 300 can then return toward 302.

At 310, the concurrently received brake control signals are arbitrated to select one of the brake control signals. As described above, a variety of rules, priorities, or the like, can be used to determine which of the concurrently received control signals are to be used to control the brake control system. The selected brake control signal can be communicated to the brake system. The other brake control signals that are not selected are not communicated to the brake system. At 312, the brake system or systems are controlled according to the brake control signal selected at 310. Flow of the method 300 can then return toward 302 or terminate.

In one embodiment, a brake control system includes an interface controller configured to communicate with different control paths of sources for control of a brake system of a vehicle system. Each of the control paths is configured to communicate a control signal from a different source of the sources to control operation of the brake system. The interface controller is configured to arbitrate between the control signals concurrently received from the different sources via the control paths to dictate which of the different sources controls operation of the brake system at different times and prevent control by other sources of the different sources from concurrently controlling the operation of the brake system.

Optionally, at least one of the sources is a manually-actuated device configured to be actuated by an operator of the vehicle system. At least one of the sources can be a trip management system configured to determine or modify a trip plan of the vehicle system that designates one or more automated applications of the brake system. As another example, at least one of the sources can be an off-board system that remotely controls movement of the vehicle system.

The sources optionally can include (a) a manually-actuated device configured to be actuated by an operator of the vehicle system to engage the brake system and (b) a trip management system configured to determine or modify a trip plan of the vehicle system that designates one or more automated applications of the brake system at one or more of different locations, different distances, or different times during at least an upcoming segment of a trip of the vehicle system. The interface controller can be configured to arbitrate between which of the manually-actuated device and the trip management system controls the brake system during slowing or stopping of the vehicle system.

The interface controller can be configured to arbitrate between the control signals to dictate which of the different sources controls operation of the brake system based on which of the control signals directs more braking effort to be generated by the brake system. Optionally, the interface controller can be configured to arbitrate between the control signals to dictate which of the different sources controls operation of the brake system based on which of the control signals is received by the interface controller before one or more other signals of the control signals.

The interface controller can be configured to arbitrate between the control signals to dictate which of the different sources controls operation of the brake system based on a position of a manually-actuated switch. The interface controller optionally can be configured to arbitrate between the control signals to dictate which of the different sources controls operation of the brake system based on expected changes in vehicle handling parameters of the vehicle system associated with the control signals.

In one example, the interface controller can be configured to arbitrate between the control signals to dictate which of the different sources controls operation of the brake system based on priorities associated with the control signals. The interface controller can be configured to arbitrate between the control signals to dictate which of the different sources controls operation of the brake system based a location of a vehicle in the vehicle system in which the brake system is located. Optionally, the interface controller can be configured to arbitrate between the control signals to dictate which of the different sources controls operation of the brake system based on an operator selection.

In another example, the interface controller can be configured to, responsive to deterioration of communication of the control signal from at least one of the sources, direct the brake system to automatically implement a penalty application of the brake system. The interface controller can be configured to, responsive to deterioration of communication of the control signal from at least one of the sources, direct the brake system to be controlled by a designated manual source of the sources for control of the brake system.

Optionally, the interface controller can be configured to, responsive to deterioration of communication of the control signal from at least one of the sources, direct a user interface to generate one or more audible or visual advisory signals. The interface controller can be configured to, responsive to deterioration of communication of the control signal from at least one of the sources, control the brake system based on one or more off-board signals received from an off-board protection system. The interface controller can be configured to communicate feedback signals to the sources that sent the control signals, the feedback signals indicating one or more of (a) which of the sources controlled engagement of the brake system or (b) a braking effort applied by the brake system under direction of the source arbitrated to have control of the brake system.

In one embodiment, a method includes concurrently receiving control signals from different sources for control of operation of a brake system onboard a vehicle system, arbitrating between or among the control signals to determine which of the different sources controls operation of the brake system at different times, and preventing control of the brake system by other sources of the different sources from concurrently controlling the operation of the brake system.

Optionally, the sources include (a) a manually-actuated device configured to be actuated by an operator of the vehicle system to engage the brake system and (b) a trip management system configured to determine or modify a trip plan of the vehicle system that designates one or more automated applications of the brake system at one or more of different locations, different distances, or different times during at least an upcoming segment of a trip of the vehicle system. The control signals can be arbitrated between which of the manually-actuated device and the trip management system controls the brake system during slowing or stopping of the vehicle system.

In one embodiment, a brake control system includes an interface controller configured to concurrently receive brake control signals from different sources for concurrent control of an airbrake system of a vehicle system. The interface controller is configured to select one of the brake control signals. The interface controller is configured to communicate the brake control signal that is selected to the airbrake system for controlling operation of the airbrake system.

Optionally, the sources can include one or more of a manually-actuated device configured to be actuated by an operator of the vehicle system, a trip management system configured to determine or modify a trip plan of the vehicle system that designates one or more automated applications of the airbrake system, an off-board system that remotely controls movement of the vehicle system, and/or a vehicle controller of another vehicle in the vehicle system.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    an interface controller configured to communicate with different control paths of sources for control of a brake system of a vehicle system, each of the control paths configured to communicate a control signal from a different source of the sources to control operation of the brake system, the sources including at least a first source and a trip management system, the trip management system configured to determine operational settings for controlling the vehicle system during an upcoming segment of a trip of the vehicle system that reduces fuel consumption, emission generation, or both fuel consumption and emission generation of the vehicle system relative to the vehicle system traveling according to settings other than the operational settings determined by the trip management system, the operational settings determined by the trip management system including throttle settings and brake settings of the vehicle system,
    the interface controller configured to arbitrate between the control signals concurrently received from the different sources via the control paths to dictate whether the trip management system or at least the first source controls operation of the brake system at different times and prevent control by other sources of the different sources from concurrently controlling the operation of the brake system.

2. The system of claim 1, wherein the first source is a manually-actuated device configured to be actuated by an operator of the vehicle system.

3. The system of claim 1, wherein the trip management system is configured to determine or modify the operational settings of the vehicle system for one or more automated applications of the brake system.

4. The system of claim 1, wherein the first source is an off-board system that remotely controls movement of the vehicle system.

5. The system of claim 1, wherein the first source includes a manually-actuated device configured to be actuated by an operator of the vehicle system to engage the brake system and the trip management system is configured to determine or modify the operational settings of the vehicle system that designate one or more automated applications of the brake system at one or more of different locations, different distances, or different times during the upcoming segment of the trip of the vehicle system,
    wherein the interface controller is configured to arbitrate between which of the manually-actuated device and the trip management system controls the brake system during slowing or stopping of the vehicle system.

6. The system of claim 1, wherein the interface controller is configured to arbitrate between the control signals to dictate which of the sources controls operation of the brake system based on which of the control signals directs more braking effort to be generated by the brake system.

7. The system of claim 1, wherein the interface controller is configured to arbitrate between the control signals to dictate which of the sources controls operation of the brake system based on which of the control signals is received by the interface controller before one or more other signals of the control signals.

8. The system of claim 1, wherein the interface controller is configured to arbitrate between the control signals to dictate which of the sources controls operation of the brake system based on a position of a manually-actuated switch.

9. The system of claim 1, wherein the interface controller is configured to arbitrate between the control signals to dictate which of the sources controls operation of the brake system based on expected changes in vehicle handling parameters of the vehicle system associated with the control signals.

10. The system of claim 1, wherein the interface controller is configured to arbitrate between the control signals to dictate which of the sources controls operation of the brake system based on priorities associated with the control signals.

11. The system of claim 1, wherein the interface controller is configured to arbitrate between the control signals to dictate which of the sources controls operation of the brake system based a location of a vehicle in the vehicle system in which the brake system is located.

12. The system of claim 1, wherein the interface controller is configured to arbitrate between the control signals to dictate which of the sources controls operation of the brake system based on an operator selection.

13. The system of claim 1, wherein the interface controller is configured to, responsive to deterioration of communication of the control signal from at least one of the sources, direct the brake system to automatically implement a penalty application of the brake system.

14. The system of claim 1, wherein the interface controller is configured to, responsive to deterioration of communication of the control signal from at least one of the sources, direct the brake system to be controlled by a designated manual source of the sources for control of the brake system.

15. The system of claim 1, wherein the interface controller is configured to, responsive to deterioration of communication of the control signal from at least one of the sources, direct a user interface to generate one or more audible or visual advisory signals.

16. The system of claim 1, wherein the interface controller is configured to, responsive to deterioration of communication of the control signal from at least one of the sources, control the brake system based on one or more off-board signals received from an off-board protection system.

17. The system of claim 1, wherein the interface controller is configured to communicate feedback signals to the sources that sent the control signals, the feedback signals indicating another source of the sources that controlled engagement of the brake system and a braking effort applied by the brake system under direction of the other source that was arbitrated to have control of the brake system.

18. A method comprising:
concurrently receiving control signals from different sources for control of operation of a brake system onboard a vehicle system, the different sources including at least a first source and a trip management system, the trip management system configured to determine operational settings for controlling the vehicle system during an upcoming segment of a trip of the vehicle system that reduces fuel consumption, emission generation, or both fuel consumption and emission generation of the vehicle system relative to the vehicle system traveling according to settings other than the operational settings determined by the trip management system, the operational settings determined by the trip management system including throttle settings and brake settings of the vehicle system;
arbitrating between or among the control signals to determine whether the trip management system or at least the first source controls operation of the brake system at different times; and
preventing control of the brake system by other sources of the different sources from concurrently controlling the operation of the brake system.

19. The method of claim 18, wherein the sources include (a) a manually-actuated device configured to be actuated by an operator of the vehicle system to engage the brake system and (b) the trip management system configured to determine or modify a trip plan of the vehicle system that designates one or more automated applications of the brake system at one or more of different locations, different distances, or different times during at least the upcoming segment of the trip of the vehicle system,
wherein the control signals are arbitrated between which of the manually-actuated device and the trip management system controls the brake system during slowing or stopping of the vehicle system.

20. A system comprising:
an interface controller configured to concurrently receive brake control signals from different sources for concurrent control of an airbrake system of a vehicle system, the sources including at least a first source and a trip management system, the trip management system configured to determine or modify a trip plan of the vehicle system that designates one or more automated applications of the airbrake system to reduce one or both of fuel consumption or emission generation by the vehicle system relative to the vehicle system traveling according to other applications of the airbrake system; and
the interface controller configured to select one of the brake control signals, the interface controller configured to communicate the brake control signal that is selected to the airbrake system for controlling operation of the airbrake system.

21. The system of claim 20, wherein the at least the first source includes a manually-actuated device configured to be actuated by an operator of the vehicle system, an off-board system that remotely controls movement of the vehicle system, and a vehicle controller of another vehicle in the vehicle system.

\* \* \* \* \*